United States Patent [19]

Kawase

[11] Patent Number: 5,934,326
[45] Date of Patent: Aug. 10, 1999

[54] PRESSURE REGULATING VALVE

[75] Inventor: Kazuo Kawase, Saitama, Japan

[73] Assignees: Akebono Brake Industry Co., Ltd., Tokyo; Akebono Research and Development Centre Ltd., Hanyu, both of Japan

[21] Appl. No.: 09/021,450

[22] Filed: Feb. 10, 1998

[30] Foreign Application Priority Data

Feb. 10, 1997 [JP] Japan ................................ 9-026312

[51] Int. Cl.[6] .................................................. F16K 11/10
[52] U.S. Cl. ............................. 137/869; 91/452; 303/11
[58] Field of Search ............................ 91/452; 137/869; 303/11, 113.2, DIG. 1, DIG. 2

[56] References Cited

FOREIGN PATENT DOCUMENTS 61-53265  11/1986  Japan .

Primary Examiner—Gerald A. Michalsky
Attorney, Agent, or Firm—Morgan, Lewis & Bockius LLP

[57] ABSTRACT

A pressure regulating valve is provided with a first valve for opening and closing a flow channel between a fluid pressure source and a reservoir, and a second valve for opening and closing a flow channel between an output chamber and the reservoir in order to regulate the pressure applied from the fluid pressure source in proportion to an input fluid pressure in an input chamber and to output the regulated pressure from the output chamber. A slidable valve body with one end subjected to an input pressure and the other end subjected to an output pressure, and a one-way valve for allowing communication only from the fluid pressure source to the output chamber are featured in that the movement of the valve body by a given quantity causes the first valve to close after the second valve is closed as the pressure in the input chamber rises.

4 Claims, 5 Drawing Sheets

PRESSURE REGULATING VALVE

BACKGROUND OF THE INVENTION

1. Field of the Invention

The present invention relates to a pressure regulating valve for proportionally controlling an output fluid pressure with respect to an input fluid pressure by utilizing an external fluid pressure source and more particularly to a pressure regulating valve fit for use in a fluid pressure brake which is designed to improve responsivity as well as operating feeling at the time the brake is applied.

2. Description of the Prior Art

In a known fluid pressure brake system of the sort described in Japanese Patent Publication No. Sho. 61-53265, for example, a fluid pressure is supplied from a fluid pressure pump to a brake while the fluid pressure is regulated by a pressure regulating valve.

A brief description will subsequently be given of the fluid pressure brake system described in the aforesaid Japanese Patent Publication by referring to FIG. 5. In this system, an oil pressure is generated in a master cylinder 302 when a driver puts on a brake pedal 301 and the pressure is led to a modulator cylinder 303 via branch pipe lines 304a, 306a and acts on the bases of pistons 307, 308, thus causing the pistons 307, 308 to be displaced to the left. Then the conical end portion 310 of an isolation valve 309 causes the hole 311 of the piston 308 and a flow channel 312 to close, so that a servo oil pressure is generated in a chamber 313.

The fluid pressure generated in the chamber 313 causes the isolation valve 309 to be displaced against the force of a reset spring 314 and this results in making working fluid flow into a distributing chamber 315 and further into each chamber 317 of both servo cylinders via a pipe line 316. The pressure generated in the chamber 317 causes a servo piston 318 to be displaced and a stem 319 is displaced to the right in FIG. 5 in this state. Consequently, a flange 330 in the end portion of each stem engages with a corresponding auxiliary piston 321, so that the hole 322 of each auxiliary piston 321 is closed.

Then the working fluid in the chamber 323 is pressurized by the thrust of the servo piston 318 and transmitted from the master cylinder 302 so as to increase oil pressure existing in the chamber 323 proportionally further. On receiving the servo force, the auxiliary piston 321 operates the brake with the effect of applying the brake when the brake pedal 301 is stepped on lightly.

When the fluid pressure in the master cylinder is held to be constant after the brake is operated, however, the discharge pressure of the pump also has to be held constant in the aforesaid fluid pressure brake system which employs the pressure regulating valve comprising the pistons 307, 308 and the isolation valve 309. For this reason, the load of a motor for driving the pump is not released and a great deal of electric power has been consumed during the time the fluid pressure is thus held. Further, the responsivity and feeling characteristics have been insufficient because of the absence of jump-up characteristics in the initial state of the application of the brake.

SUMMARY OF THE-INVENTION

It is therefore an object of the present invention to curtail power consumption of a motor by making the discharge port of a pump communicate with a reservoir while a fluid pressure is held.

When the present invention is applied to a brake system, brake responsivity is improved and proper brake feeling is obtainable by making the rise-up of a brake fluid pressure greater than before due to the function of a pressure regulating valve in the initial state of the application of a brake.

According to the present invention, there is provided a pressure regulating valve comprising: a first valve for opening and closing a flow channel between a fluid pressure source and a reservoir; a second valve for opening and closing a flow channel between an output chamber and the reservoir so as to regulate a pressure applied from the fluid pressure source in proportion to an input fluid pressure in an input chamber, thereby outputting the regulated pressure from the output chamber; a slidable valve body with one end subjected to an input pressure and the other end subjected to an output pressure; and a one-way valve for allowing communication only from the fluid pressure source to the output chamber, wherein a movement of the valve body by a given quantity causes the first valve to close after the second valve is closed as the pressure in the input chambe rises.

DETAILED DESCRIPTION OF THE PREFERRED EMBODIMENTS

Figure 1:
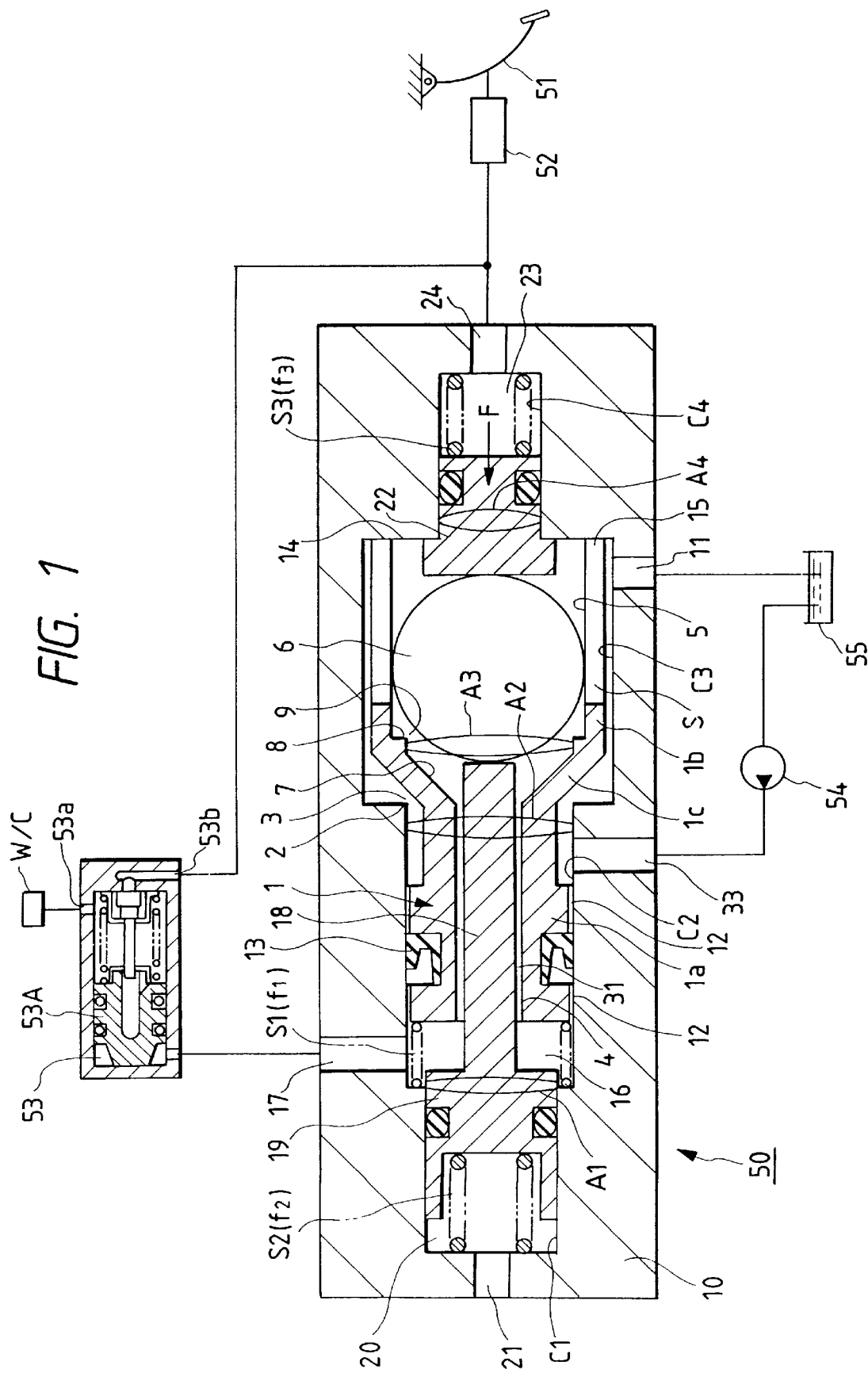
FIG. 1 is a block diagram of a fluid pressure brake system employing a pressure regulating valve according to the present invention, wherein the pressure regulating valve and an actuator are shown in cross section.

Referring to the drawings, there is given a detailed description of embodiments of the present invention. FIG. 1 is a block diagram of a brake system employing a pressure regulating valve according to the present invention, wherein the pressure regulating valve and an actuator are shown in cross section; and FIG. 2 a graphic representation showing the relation between brake force and working fluid pressure accompanied with the functioning of the pressure regulating valve.

In FIG. 1, reference numeral 50 denotes a pressure regulating valve according to this embodiment of the present invention; 51, a brake pedal; 52, a master cylinder; 53, a brake actuator; 54, a fluid pressure pump; and 55, a reservoir, these being coupled together via piping to constitute a fluid pressure brake system. When a driver steps on the brake pedal 51 in this fluid pressure brake system, the fluid pressure is generated in the master cylinder 52, and a fluid pressure corresponding to the fluid pressure thus generated is regulated by the pressure regulating valve 50. When the regulated fluid pressure acts on the brake actuator 53, the fluid pressure generated in the brake actuator 53 is supplied into a wheel cylinder W/C via a port 53a, so that the brake operates.

The pressure regulating valve 50 is provided with a body 10 in which four cylinder holes C1, C2, C3, C4 different in cross sectional area are consecutively formed as shown in FIG. 1. In the two cylinder holes C2, C3 disposed in the central portion is a valve body 1 having a small diameter portion 1a, a conical portion 1c and a large-diameter portion 1b, the small diameter portion 1a being slidable in the cylinder hole C2. The conical portion 1c of the valve body 1 and a stepped portion between the two cylinder holes C2, C3 constitute a first valve 3. In the central portion of the valve body 1, a small-diameter hole 4 and a large-diameter hole 5 which are so configured as to substantially conform to the external configuration of the valve body 1 are consecutively formed, and a ball 6 (a valve element) is contained in the large-diameter hole 5 and used to form a second valve 9 with respect to a valve seat 8 formed on a conical wall portion 7 which makes the small- and large-diameter holes 4, 5 consecutive. A number of slits S which allow fluid to pass therethrough are formed around the circumference of the large-diameter portion 1b of the valve body 1. The inside of the large-diameter hole 5 and the reservoir 55 communicate with each other via a discharge port 11 formed in the cylinder hole C3 of the body 10.

An axially-directed flow channel 12 is formed on the outer periphery of the small diameter portion 1a of the valve body 1 disposed in the cylinder hole C2 and further a sealing member (one-way valve) 13 for unidirectionally leading the flow channel 12 is arranged between the outer periphery of the small diameter portion 1a of the valve body 1 and the inner periphery of the cylinder hole C2. The flow channel 12 communicates with the discharge port of the fluid pressure pump 54 via a fluid pressure source port 33 formed in the body 10. The suction port of the fluid pressure pump 54 communicates with the reservoir 55.

The valve body 1 is urged to the right in FIG. 1 by a first spring (first urging means) S1 (with a spring force of f1) installed between the stepped portions of the cylinder holes C1, C2 and the valve body 1, the end portion 15 of the large-diameter hole 5 of the valve body 1 being brought into contact with a stopper 14 formed by the stepped portion of the cylinder holes C3, C4. A chamber for accommodating the first spring S1 forms an output chamber 16, which communicates with an actuator 53 via an output port 17.

A piston rod 18 is provided in the cylinder hole C1, and a piston 19 having a sectional area of A1 is also disposed therein and urged to the right in FIG. 1 by a second spring (second urging means) S2 (with a spring force of f2) installed between the cylinder hole C1 and the piston 19, the end portion of the piston rod 18 being brought into contact with the ball 6. A gap 31 is formed between the piston rod 18 and the inner peripheral wall of the valve body 1, whereby the output chamber 16 is made to communicate with the inside of the large-diameter hole 5. Moreover, the accommodating chamber 20 of the second spring S2 communicates with the atmosphere via a hole 21 formed in the body.

The small-diameter portion (sectional area A4) of a stepped operating lever 22 is slidably disposed in the cylinder hole C4, and the operating lever 22 is urged to the left in FIG. 1 by a third spring (third urging means) C3 (with a spring force of f3) installed in the cylinder hole C4 and brought into contact with the ball 6. An input chamber 23 communicates with the master cylinder 52 via an input port 24 formed in the body 10.

In this case, the force f2 of the second spring S2 and the force f3 of the third spring S3 satisfy the following relation:

the force f2 of the second spring S2>the force f3 of the third spring S3.

The actuator 53 communicating with the output port 17 of the body 10 is so constructed as already known and used to operate an actuator piston 53A by means of fluid pressure from the pressure regulating valve 50, whereby it can work the brake by making the fluid pressure from the port 53 act of a wheel cylinder W/C. The actuator 53 is equipped with a flow channel 53b for use in supplying the fluid pressure from the master cylinder directly to the wheel cylinder W/C when no fluid pressure is generated from the output port 17 because the fluid pressure pump malfunctions, for example.

The operation of the pressure regulating valve 50 will subsequently be described.

While the driver does not step on the brake pedal 51, the pressure regulating valve 50 remains in the initial position as shown in FIG. 1 since the force f2 of the second spring S2 is greater than that f3 of the third spring S3. Consequently, the discharge port of the fluid pressure pump 54 communicates with the reservoir 55 via fluid pressure source port 33→the opened first valve 3→the discharge port 11 formed in the body 10. Therefore, no fluid pressure acts on the actuator 53 and the brake is not operated.

When the driver steps on the brake pedal 51, the fluid pressure pump 54 is simultaneously operated and the fluid pressure is generated in the master cylinder 52. The fluid pressure thus generated in the master cylinder 52 is supplied to the input chamber 23 via the input port 24 formed in the body 10 of the pressure regulating valve 50, and the operating lever 22 is moved to the left in FIG. 1 with a force of F. When the operating lever 22 is thus moved, the piston 19 is moved to the left in FIG. 1 against the urging force f2 of the second spring S2 via the piston rod. The second valve 9 formed with the ball 6 and the valve seat 8 of the conical wall surface 7 is closed first and then the first valve 3 is closed when the valve body 1 is moved to the left by the predetermined quantity.

As a result, the fluid discharged from the fluid pressure pump 54 is made to flow into the output chamber 16 via the right-hand flow channel 12 formed on the outer periphery of the small diameter portion of the valve body 1 in FIG. 1→the sealing member 13 that allows the fluid to flow unidirectionally→the left-hand flow channel 12 formed on the outer periphery of the small diameter portion in FIG. 1, and causes the actuator piston 53A in the actuator 53 to move to the right in FIG. 1, thus operating the brake. When the fluid pressure in the output chamber 16 rises in this state, the piston 19 is moved to the left in FIG. 1 against the urging force of the second spring S2, and the piston rod 18 is separated from the ball 6.

As the acting force F increases further, the fluid pressure in the output chamber 16 proportionally rises, thus keeping the braking force increasing.

When the driver holds the force of pressing down the brake pedal 51 to be constant, the fluid pressure in the output chamber 16 is slightly raised by the fluid pressure pump and causes the valve body 1 to move to the right, so that the first valve 3 is opened. Consequently, the passage between the discharge port of the fluid pressure pump 54 and the reservoir 55 is opened and the load of the fluid pressure pump 54 is released with the effect of reducing not only the power consumption of the fluid pressure pump motor but also the operating sound. At this point of time, however, the force F of the operating lever keeps the ball 6 staying on the left-hand side in FIG. 1 and the second valve 9 is also left closed.

When the brake pedal is restored to reduce the fluid pressure in the master cylinder in order to release the brake, the acting force F of the operating lever 22 is reduced and the ball 6 is moved to the right because of the pressure in the output chamber 16 and the urging force of the second spring S2. The second valve 9 is then opened and the pressure in the output chamber 16 is reduced in agreement with the acting force F of the operating lever 22 on the basis of the relation between the acting force F and the urging force of the second spring S2.

When the fluid pressure P in the output chamber 16 subsequently becomes

P<force f2 of second spring S2/A1, the urging force of the second spring S2 causes the piston 19 to the right in FIG. 1, and the ball 6 is pushed by the piston rod 18 and separated from the valve seat 8. Then the second valve 9 is opened to make the output chamber 16 communicate with the reservoir 55, and the lowered fluid pressure in the output chamber 16 releases the brake.

A detailed description will subsequently be given of the relation between the force F acting on the operating lever and the fluid pressure P in the output chamber 16 by referring to FIG. 2.

When the fluid pressure is generated in the master cylinder 52 after the brake pedal 51 is pressed down, the force F directed to the left-hand side is applied to the operating lever 22 with the fluid pressure at this point of time. This force F causes the piston 19 to move to the left in FIG. 1 via the ball 6 and the piston rod 18. The second valve 9 formed with the ball 6 and the valve seat 8 of the conical wall surface 7 is closed first and then the first valve 3 is closed when the piston 19 is moved to the left; in FIG. 2, point a refers to this state.

When the first valve 3 is closed, the fluid discharged from the fluid pressure pump 54 is made to flow into the output chamber 16 via the flow channel 12 formed on the outer periphery of the small diameter portion of the valve body 1→the sealing member 13 that allows the fluid to flow unidirectionally→the flow channel 12 formed on the outer periphery of the small diameter portion, and causes the actuator piston 53A in the actuator 53 to move, thus operating the brake.

Given that the fluid pressure in the output chamber 16 is P then, the relation between the fluid pressure P and the force is given by $$A2 \cdot P + f1 + f2 = F + A1 \cdot P + f3$$

Figure 2:
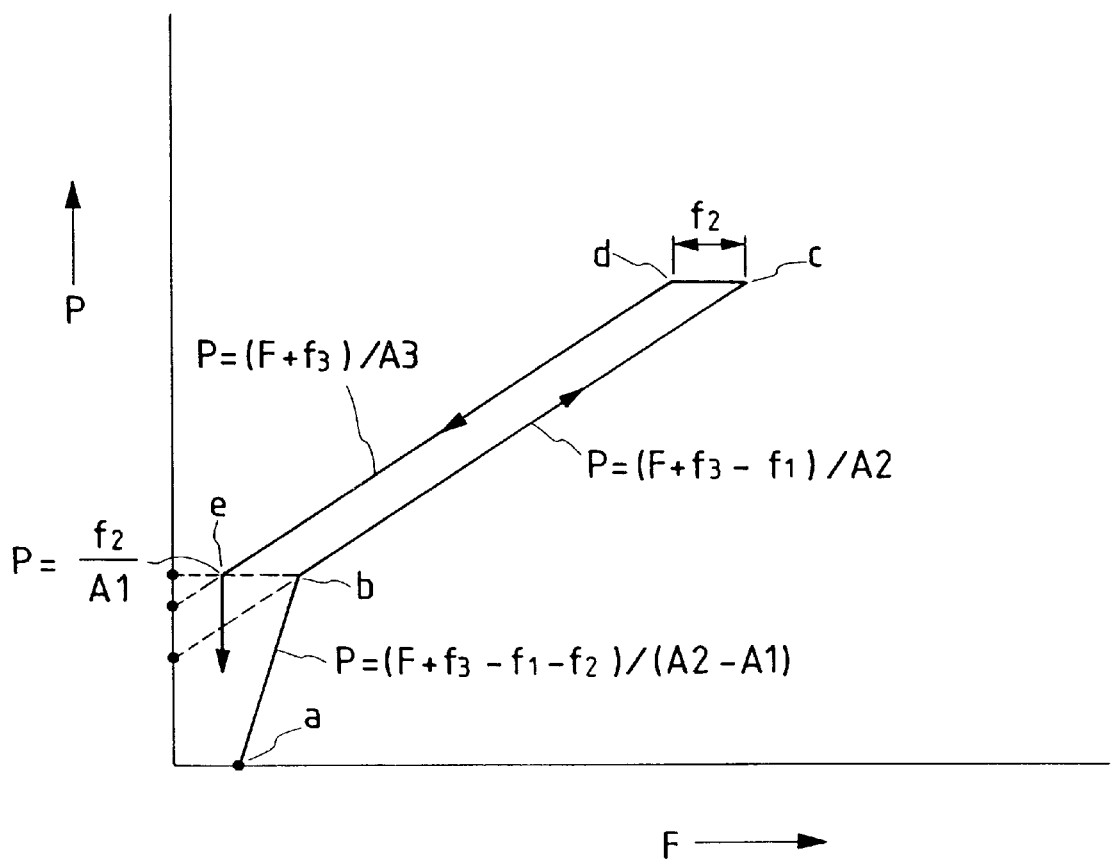
FIG. 2 is a graphic representation showing the relation between brake force and working fluid pressure accompanied with the functioning of the pressure regulating valve.

This can be varied to obtain the fluid pressure P in the output chamber 16 as follows:

$$P(A2-A1) = F + f3 - f1 - f2$$

$$P = (F + f3 - f1 - f2)/(A2 - A1)$$

thus, the fluid pressure increases in accordance with the equations above (from point a up to point b in FIG. 2).

Further, the fluid pressure in the output chamber 16 is increasingly raised as the force F of the operating lever 22 increases and the piston 19 is moved to the left in FIG. 1 against the urging force of the second spring S2. The piston rod 18 is thus separated from the ball 6 (point 1 in FIG. 2).

Thereafter, the fluid pressure P in the output chamber 16 changes from $$A2 \cdot P = F + f3 - f1 \text{ to}$$

$$P = (F + f3 - f1)/A2$$

As the force F of the operating lever 22 increases, the fluid pressure P in the output chamber 16 is kept increasing in accordance with the equations above (point b to point c in FIG. 2).

In order to release the brake, the brake pedal is restored and as the fluid pressure in the master cylinder decreases, the acting force F of the operating lever 22 is also reduced and the fluid pressure in the output chamber 16 together with the urging force of the first spring S1 causes the valve body 1 to move to the right in FIG. 1. Thus, the pressure load of the fluid pressure pump is released as the first valve 3 is opened (from point c up to point d in FIG. 2).

Then the valve body 1 is moved to the right in FIG. 1 until its large-diameter end portion is brought into contact with the stopper 14 and further the fluid pressure P in the output chamber is reduced (from point d up to point e in FIG. 2) in conformity with the following equations:

from $P \cdot A3 = F + f3$ to $P = (F + f3)/A3$ on the basis of the relation among the fluid pressure acting on the sectional area A3 of the flow channel in the second valve 9, the acting force F of the operating lever 22, and the force f3 of the third spring S3.

When the fluid pressure P in the output chamber 16 becomes f2/A1, the ball 6 is pushed by the piston rod 18 and this results in separating the ball 6 from the conical wall surface 7. Then the second valve 9 is opened and the output chamber 16 communicates with the reservoir 55, whereby the brake is released (point e in FIG. 2).

In other words, the fluid pressure in the output chamber 16 of the pressure regulating valve 50 is increased at the time the brake is applied:

when $$P \geq f2/A1 : P = (F + f3 - f1)/A2;$$

when $$0 \leq P < f2/A1 : P = (F + f3 - f1 - f2)/(A2 - A1);$$

and the fluid pressure therein is decreased at the time the brake is released:

when $$P > f2/A1 : P = (F + f3)/A3$$

further, the brake is released when the fluid pressure P in the output chamber 16 becomes f2/A1 or less.

As described above, according to this embodiment of the present invention, the brake fluid pressure can rapidly be increased (from point a up to b in FIG. 2) in the initial state where the brake is applied, whereby the responsivity and feeling of the brake are improvable.

A second embodiment of the present invention will subsequently be described.

The second embodiment of the present invention is similar to the first embodiment thereof as far as the whole brake system configuration is concerned but different from the first embodiment thereof in that a spool valve (valve element) instead of the ball valve and a check valve (one-way valve) instead of the sealing member are employed, wherein like reference characters starting from 100 with the same last two digits are given to corresponding members in the first embodiment thereof.

Figure 3:
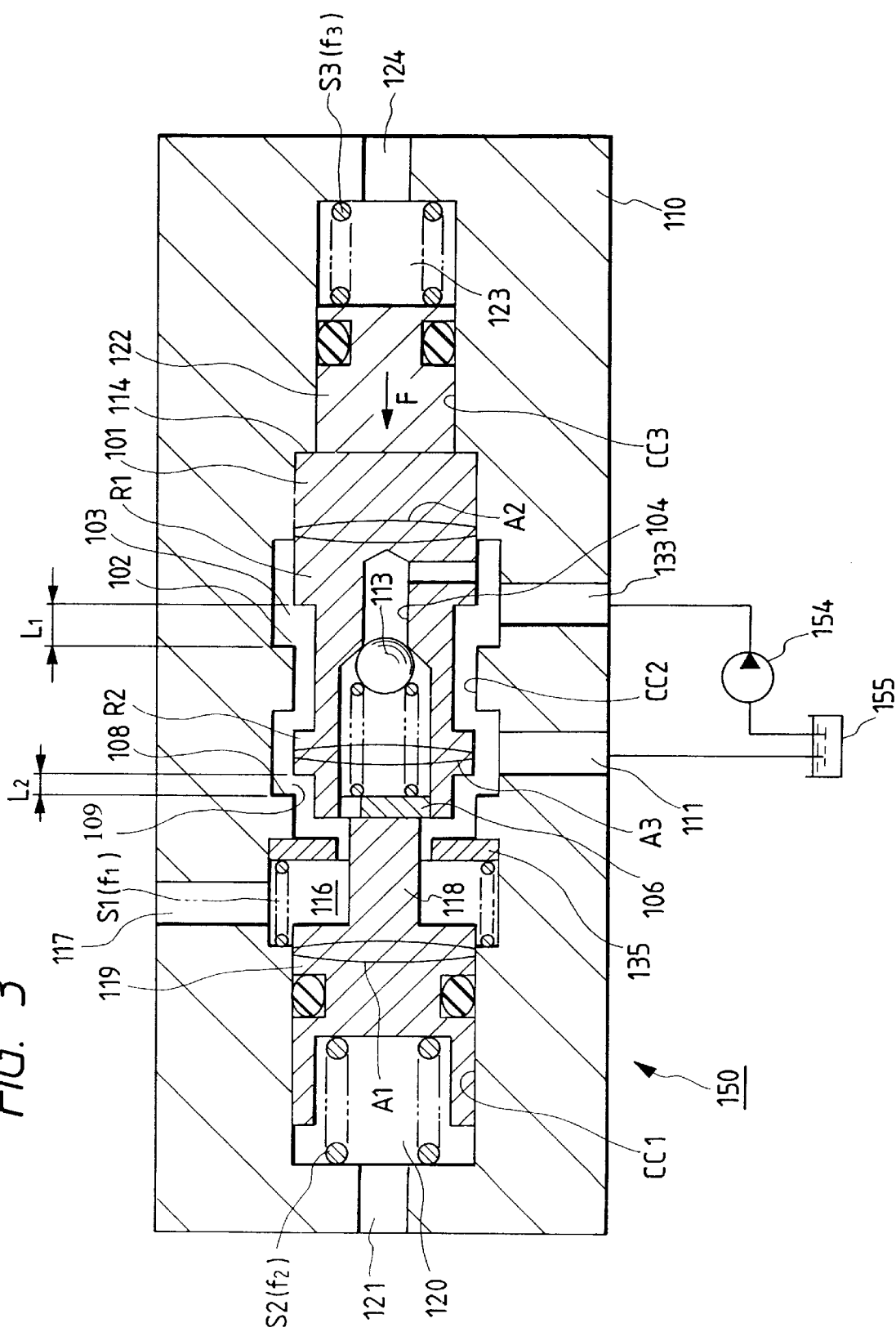
FIG. 3 is a sectional view of a pressure regulating valve is a according to a second embodiment of the present invention.

As shown in FIG. 3, a pressure regulating valve 150 has a body 110 in which there are three consecutive cylinder holes CC1, CC2, CC3 which are used for accommodating members constituting the pressure regulating valve and different in sectional area from each other. A spool valve body 101 is slidably disposed in the central cylinder hole CC2, and two land portions R1, R2 are formed in the spool valve body 101. In addition, there are a first valve 103 having a sectional area of A2 together with the land portion R1 and a valve seat 102 formed on the inner periphery of the cylinder hole CC2, and a second valve 109 having a sectional area of A3 together with the land portion R2 and a valve seat 103 formed on the inner periphery of the cylinder hole CC2. Further, the second valve 109 is arranged in such a way that its stroke is set shorter than that of the first valve 103 (L2<L1) so that when the spool valve body 101 is moved to the left, the second valve 109 is closed quicker than the first valve 103.

A distributing hole 104 is bored in the central portion of the spool valve body 101, and a check valve 113 is installed in the distributing hole 104. A hole on the upstream side of the check valve 113 communicates with a fluid pressure source port 133 formed in the body, whereas a hole on the downstream side of the check valve 113 communicates with an output chamber 116 formed with respect to a piston 119 contained in the cylinder hole CC1. Further, a reservoir 155 communicates with a portion extending between the valve seats 102, 108 formed in the body 110 via a discharge port 111 formed in the body.

A piston rod 118 is provided in the cylinder hole CC1, and the piston 119 having a sectional area of A1 is disposed therein and urged to the right in FIG. 3 by a second spring S2 (with a spring force of f2) installed between the cylinder hole CC1 and the piston 119. The end portion of the piston rod 118 is brought into contact with the edge face of the spool valve body 101, and a chamber 120 for containing the second spring communicates with the atmosphere via a hole 121 formed in the body. Incidentally, reference numeral 106 in FIG. 3 denotes the spring seat of the check valve 113 accommodated in the spool valve body 101.

The output chamber 116 is installed between the piston 119 and the spool valve body 101 and communicates with an actuator 53 as in the first embodiment via an output port 117 formed in the body 110. A first spring S1 (with a spring force of f1) is installed in the output chamber 116, and the spool valve body 101 can be moved to the left while the first spring S1 is urged to be shorten via a spring seat 135.

An operating lever 122 is slidably disposed in the cylinder hole CC3, and the operating lever 122 is urged to the left in FIG. 3 by a third spring S3 (with a spring force of f3) installed in the cylinder hole CC3 and brought into contact with the spool valve body 101. An input chamber 123 communicates with a master cylinder via an input port 124 formed in the body 110.

In this case, the force f2 of the second spring S2 and the force f3 of the third spring S3 satisfy the following relation:

the force f2 of the second spring S2>the force f3 of the third spring S3.

While the brake pedal is not pressed down, the force f2 of the second spring S2 is greater than the force f3 of the third spring S3, and the spool valve body 101 is brought into contact with a stopper formed on the stepped portion between the cylinder holes CC2, CC3 because the pressure regulating valve 150 is placed in the initial position as shown in FIG. 3. Consequently, the discharge port of a fluid pressure pump 154 communicates with the reservoir via the fluid pressure source port 133→the open first valve 103→the discharge part 111 formed in the body 110. Therefore, no fluid pressure acts on the actuator and the brake is not operated.

When the driver steps on the brake pedal, the fluid pressure pump 154 operates to simultaneously generate the fluid pressure in the master cylinder. The fluid pressure generated in the master cylinder is supplied to the input chamber 123 via the input port 124 formed in the body 110 of the pressure regulating valve 150, whereby the operating lever 122 is moved to the left in FIG. 3. The movement of the operating lever 122 causes the second valve 109 to close and makes the spool valve body 101 move the first spring S1 to the left by a predetermined quantity while urging the first S1 spring via the spring seat 135. Thus, the first valve 103 is closed.

Consequently, the fluid discharged from the fluid pressure pump is made to flow into the output chamber 116 via the distributing hole 104 of the spool valve body 101→the check valve 113, and also causes the actuator piston in the actuator to move, thus operating the brake.

As the fluid pressure in the output chamber 116 rises further in this state, the piston 119 is moved to the left in FIG. 3 against the urging force of the second spring S2, and the piston rod 118 is separated from the spool valve body 101.

When the fluid pressure in the output chamber 116 rises further, the fluid pressure in the output chamber 116 is combined with the acting force F with the effect of keeping the brake operating as in the first embodiment of the present invention on the basis of the relation among the fluid pressure acting on the sectional area A2 of the first valve 103, the acting force F of the operating lever 122, the force f1 of the first spring S1 and the force f3 of the third spring S3.

In order to release the brake, the brake pedal is restored and when the fluid pressure in the master cylinder is reduced, the acting force F of the operating lever 122 decreases. Then the spool valve body 101 is moved to the right in FIG. 3 by the fluid pressure in the output chamber 116 and the urging force of the first spring S1, whereby the pressure load of the fluid pressure pump is released as the first valve 103 is opened.

When the fluid pressure P in the output chamber 116 acting on the sectional area A3 of the second valve 109 becomes P<the force f2 of the second spring S2/A1, the piston 119 is moved to the right in FIG. 3 because of the urging force of the second spring S2, and the spool valve body 101 is pushed by the piston rod 118. Then the second valve 108 is opened to communicate the output chamber 116 with the reservoir, so that the fluid pressure in the output chamber 116 is reduced to release the brake.

The description of the relation between the force F applied to the operating lever and the fluid pressure P in the output chamber 116 will be omitted because the relation is similar to what has been described in reference with the first embodiment of the present invention.

Even in this embodiment of the present invention as described above, the brake fluid pressure can be increased sharply in the initial state of applying the brake, whereby the brake responsivity and feeling are improvable as shown in the fluid pressure characteristic chart of FIG. 2 likewise.

Although it has been arranged that the fluid pressure from the pressure regulating valve 50, 150 is to be transmitted to the actuator in the first and second embodiments of the present invention, the fluid pressure from the pressure regulating valve 50, 150 may be supplied directly to the wheel cylinder W/C.

Although the pressure regulating valve according to the embodiment of the present invention has been described as what is intended for fluid pressure use, it is needless to say utilizable for pneumatic use.

Figure 4:
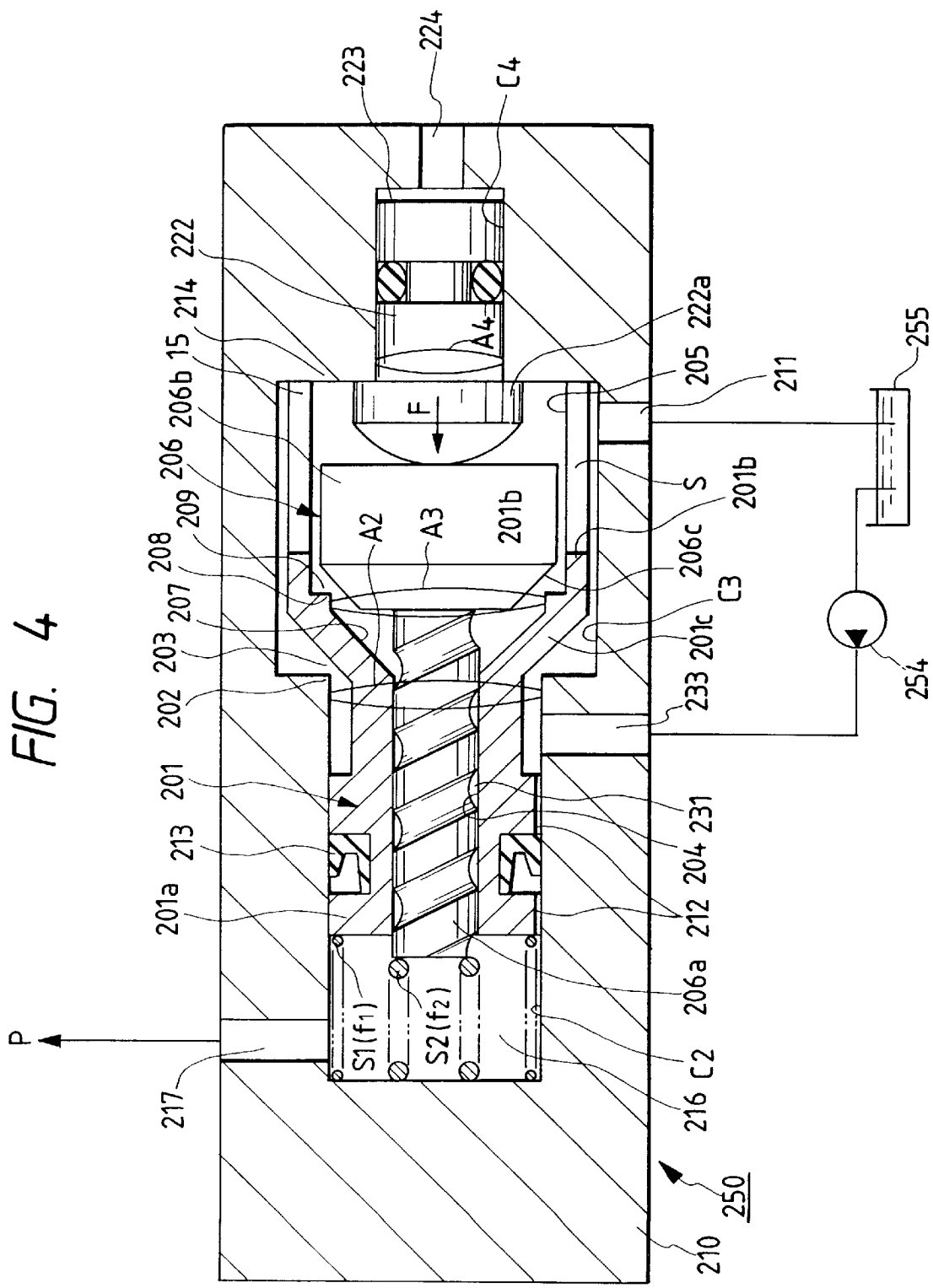
FIG. 4 is a sectional view of a pressure regulating valve according to a third embodiment of the present invention.
Figure 5:
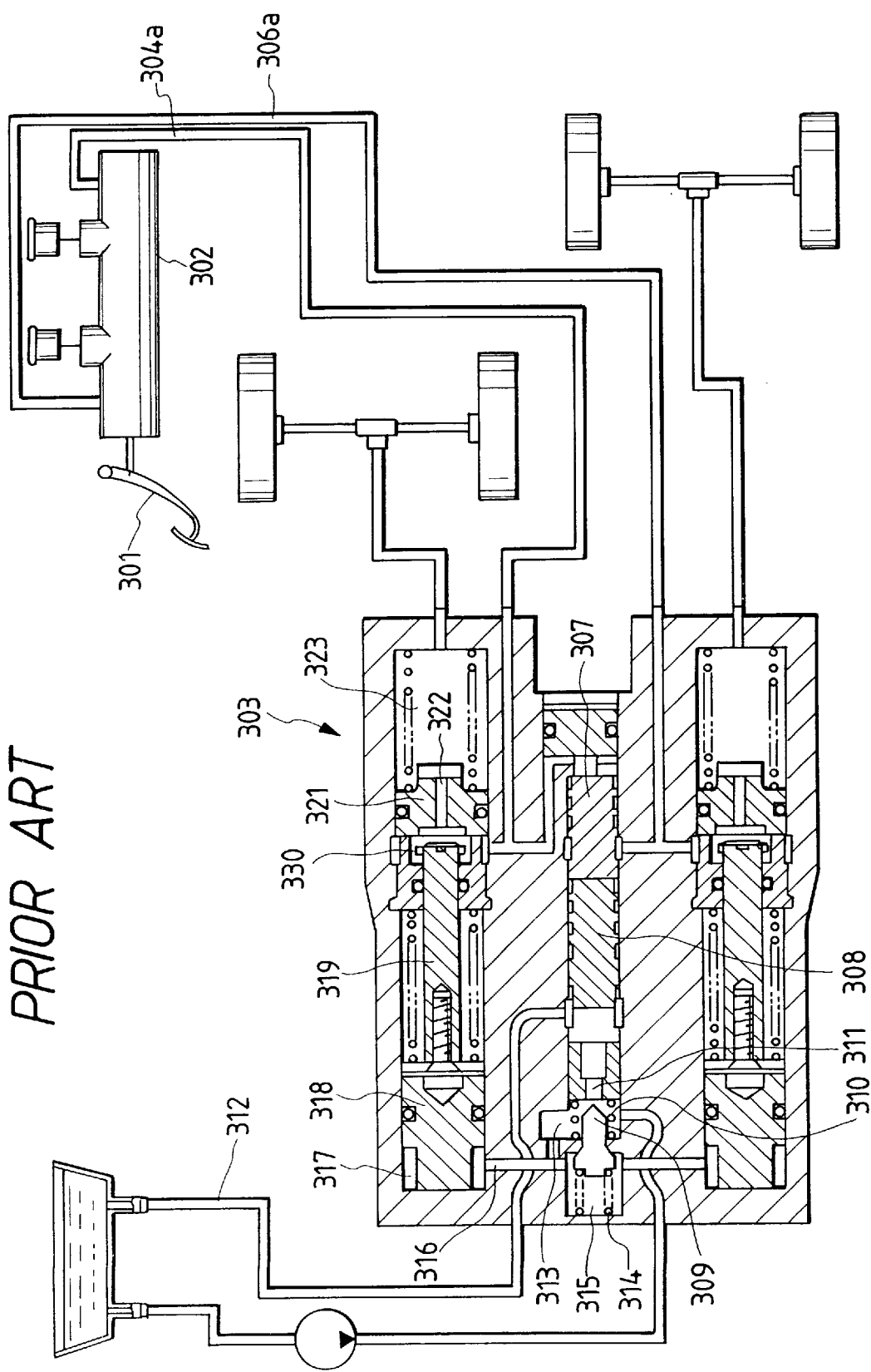
FIG. 5 is a sectional view of a conventional pressure regulating valve.

Referring to FIG. 4, there is given a description of a third embodiment of the present invention.

A pressure regulating valve 250 has a body 210 in which there are three consecutive holes C2, C3, C4 which are used for accommodating members constituting the pressure regulating valve and different in sectional area from each other as shown in FIG. 4. In the two cylinder holes C2, C3 is a valve body 201 comprising a small-diameter portion 201a, a large-diameter portion 201b and a conical portion 201c, which valve body 201 is slidably installed therein. A first valve 203 having a sectional area of A2 is formed of the conical portion 201c of the valve body 201 and the stepped portion 202 of the two cylinder holes C2, C3. In the central portion of a valve body 201 are a small-diameter portion 204 and a large-diameter portion 205 which are consecutive formed. A valve element 206 having a conical portion 206c with respect to a small-diameter portion 206a is slidably installed in the small-diameter portion 204. Further, the conical portion 206c forms a second valve 209 having an area substantially equal to A2 or slightly smaller than the area A3 with respect to a valve seat 208 formed on a conical wall portion-207 which couples the small-diameter hole 204 and the large-diameter hole 205. Slits 212 are formed in the outer periphery of the small-diameter portion 201a of the valve body 201, and a sealing member 213 (one-way valve) that allows fluid to pass therethrough unidirectionally is provided in an intermediate portion between the slits 212. Further, a number of of slits S that allows the fluid to pass therethrough is formed in the outer periphery of the large-diameter portion 201b of the valve body 201 so as to make the inside of the large-diameter portion 205 communicate with a reservoir 255 via a discharge port 211 formed in the body 210.

A spiral flow channel 231 is provided on the outer periphery of the small-diameter portion 206a of the valve element 206 so as to make an output chamber 216 communicate with the discharge port 211. A first and a second spring S1, S2 are arranged in the output chamber 216 as shown in FIG. 4, and the head portion 222a of an operating lever 222 which is slidable in the cylinder hole C4 is urged by the second spring S2 to be brought into contact with the valve body 206, whereas the valve body 201 is urged by the first spring S1 to be brought into contact with a stopper 214.

The operation of the aforesaid pressure regulating valve 250 will subsequently be described.

When the fluid pressure in a master cylinder in an input chamber 223 exceeds the acting force f2 of the second spring S2, the valve element 206 is moved to the left and the second valve 209 is closed, so that the communication between an output port 217 and the reservoir 255 is cut off. When the fluid pressure in the master cylinder rises further, the valve body 201 and the valve element 206 are integrally moved by a given quantity against the acting force f1, f2 of the first and second springs S1, S2. Then the first valve 203 is closed and the communication between the discharge port of a fluid pressure pump 254 and the reservoir 255 is also cut off. Further, the fluid discharged from the fluid pressure pump 254 is sent to a brake actuator via a port 233→the slits 212→the one-way sealing member 213→the output port 217, thus operating the brake.

The fluid pressure balance at the time of an increase in pressure is shown by the following equation:

$$P = (F - f1 - f2)/A2$$

When the driver holds the force of pressing down the brake pedal to be constant, the fluid pressure in the output chamber 216 is slightly raised by the fluid pressure pump 254 and causes the valve element 206 to move to the right, so that the first valve 203 is opened. Consequently, the flow channel between the discharge port of the fluid pressure pump 254 and the reservoir is opened and the load of the fluid pressure-pump 254 is released.

When the brake pedal is restored to open the brake by reducing the fluid pressure in the master cylinder, the acting force F of the operating lever 222 is decreased and the valve element 206 is moved to the right with respect to the valve body 201. Consequently, the brake pressure is reduced since the output chamber 216 communicates with the reservoir 255 via the spiral flow channel 231. The fluid pressure balance at the time of a decrease in pressure is shown by the following equation:

$$P = (F - f2)/A3 \qquad (A2 = A3)$$

The pistons 19, 119 in the first and second embodiments of the present invention are not arranged in the output chamber 216 according to the third embodiment thereof and this makes the arrangement in the third embodiment thereof different from those in the first and second embodiments thereof.

As set forth above in detail, since the discharge port of the fluid pressure pump communicates with the reservoir when the brake pressure is held and reduced according to the present invention, the load of the fluid pressure pump is released, whereby the power consumption of the electric motor for the fluid pressure pump is reducible. According to the first and second embodiments of the present invention, further, the rise-up of the output pressure in the pressure regulating valve in the initial state of operation can be accelerated and when the pressure regulating valve is utilized for a brake system, the responsivity of the brake is improvable.

What is claimed is:

1. A pressure regulating valve comprising:

a first valve for opening and closing a flow channel between a fluid pressure source and a reservoir;

a second valve for opening and closing a flow channel between an output chamber and the reservoir so as to regulate a pressure applied from the fluid pressure source in proportion to an input fluid pressure in an input chamber, thereby outputting the regulated pressure from the output chamber;

a slidable valve body with one end subjected to an input pressure and the other end subjected to an output pressure; and a one-way valve for allowing communication only from the fluid pressure source to the output chamber, wherein a movement of the valve body by a given quantity causes the first valve to close after the second valve is closed as the pressure in the input chamber rises.

2. The pressure regulating valve according to claim 1, further comprising second urging means for exerting force resistant to the input pressure, wherein a resisting force of the second urging means is released as the output pressure in the output chamber rises.

3. The pressure regulating valve according to claim 1, wherein the second valve comprises a valve element which is movable in the valve body, and a valve seat which is capable of engaging with the valve element and formed in the valve body.

4. The pressure regulating valve according to claim 1, wherein each of the first valve and the second valve comprises a valve seat formed in a body of the pressure regulating valve, and a land portion formed in the valve body slidable in the body of the pressure regulating valve and being capable of engaging with the valve seat.

* * * * *